US009720709B1

(12) United States Patent
Stickle

(10) Patent No.: US 9,720,709 B1
(45) Date of Patent: *Aug. 1, 2017

(54) SOFTWARE CONTAINER RECOMMENDATION SERVICE

(71) Applicant: Amazon Technologies, Inc., Seattle, WA (US)

(72) Inventor: Thomas Charles Stickle, Saint James, NY (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/822,753

(22) Filed: Aug. 10, 2015

Related U.S. Application Data

(63) Continuation of application No. 14/309,517, filed on Jun. 19, 2014, now Pat. No. 9,122,562.

(51) Int. Cl.
  *G06F 9/445* (2006.01)
  *G06F 9/50* (2006.01)
  *G06F 11/34* (2006.01)
  *G06F 11/30* (2006.01)

(52) U.S. Cl.
  CPC ........ *G06F 9/44505* (2013.01); *G06F 9/5077* (2013.01); *G06F 11/3409* (2013.01); *G06F 11/301* (2013.01)

(58) Field of Classification Search
  CPC   G06F 8/70–8/71; G06F 8/77; G06F 9/44505; G06F 9/455; G06F 9/50–9/5027; G06F 9/505; G06F 9/5061; G06F 9/5077
  See application file for complete search history.

(56) References Cited

U.S. PATENT DOCUMENTS 7,675,866 B1 * 3/2010 Pauly .................. G06F 8/77
  370/252
9,185,008 B1 * 11/2015 Stickle .............. G06F 9/45558
(Continued)

OTHER PUBLICATIONS

Litoiu et al., A business driven cloud optimization architecture, [Online] 2010, In Proceedings of the 2010 ACM Symposium on Applied Computing (SAC '10). ACM, New York, NY, USA, [Retrieved from the Internet] <http://doi.acm.org/10.1145/1774088.1774170> pp. 380-385.*

(Continued)

*Primary Examiner* — Geoffrey St Leger

(74) *Attorney, Agent, or Firm* — Thorpe North & Western LLP

(57) ABSTRACT

A technology is described for a software container recommendation service. An example method may include collecting utilization metrics for an application hosted on a computing instance. The utilization metrics may be a measure of computing resources used by the application. The utilization metrics may be analyzed to determine a level of computing resources for the computing instance used by the application. A software container configuration for the application may be determined based at least in part on the utilization metrics when analysis of the utilization metrics indicates an underutilization of computing resources by the application. The specifications of the software container configuration may then be provided to a customer.

20 Claims, 10 Drawing Sheets

(56) References Cited

U.S. PATENT DOCUMENTS

| | | | |
|---|---|---|---|
| 2002/0069399 A1* | 6/2002 | Miloushey | G06F 8/36 717/108 |
| 2005/0177635 A1* | 8/2005 | Schmidt | G06F 9/52 709/226 |
| 2006/0047802 A1* | 3/2006 | Iszlai | G06Q 10/06375 709/224 |
| 2006/0136928 A1* | 6/2006 | Crawford, Jr. | G06F 9/5077 718/105 |
| 2008/0086731 A1* | 4/2008 | Trossman | G06F 9/50 718/100 |
| 2011/0010699 A1* | 1/2011 | Cooper | G06F 21/12 717/169 |
| 2011/0247005 A1* | 10/2011 | Benedetti | G06F 9/5077 718/105 |
| 2011/0265064 A1* | 10/2011 | Hadar | G06F 17/30985 717/121 |
| 2012/0311523 A1* | 12/2012 | Venkataraman | G06F 8/71 717/104 |
| 2013/0124807 A1* | 5/2013 | Nielsen | G06F 11/1438 711/162 |
| 2013/0173804 A1* | 7/2013 | Murthy | G06F 9/5022 709/226 |
| 2013/0232254 A1* | 9/2013 | Srikanth | H04L 43/0876 709/224 |
| 2013/0239089 A1* | 9/2013 | Eksten | G06F 8/70 717/120 |
| 2014/0068611 A1* | 3/2014 | McGrath | G06F 9/45533 718/1 |
| 2014/0215452 A1* | 7/2014 | Hicks | G06F 8/65 717/172 |
| 2014/0258506 A1* | 9/2014 | Stickle | H04L 67/22 709/224 |
| 2014/0280873 A1* | 9/2014 | Stickle | H04L 63/1433 709/224 |
| 2014/0289391 A1* | 9/2014 | Balaji | H04L 43/04 709/224 |
| 2015/0032415 A1* | 1/2015 | Van Cutsem | G06F 8/77 702/187 |
| 2015/0058471 A1* | 2/2015 | McPherson | H04L 12/1432 709/224 |
| 2015/0089034 A1* | 3/2015 | Stickle | H04L 41/28 709/223 |

OTHER PUBLICATIONS

Dirk Merkel, Docker: lightweight Linux containers for consistent development and deployment, [Online] Mar. 2014, Linux Journal vol. 2014 Issue 239, [Retrieved from the Internet] <http://dl.acm.org/citation.cfm?id=2600239&CFID=652312685&CFTOKEN=85964996> pp. 76-81.*

Henry Dalziel, 11 Protocols you have got to know (Part of the 'Concise Byte Series'), [Online] Sep. 20, 2013, [Retrieved from the Internet] <https://www.concise-courses.com/11-protocols/> 6 pages total.*

Wikipedia entry for Application Response Measurement, [Retrieved from the Internet on Aug. 2, 2016] <https://en.wikipedia.org/wiki/Application_Response_Measurement> 4 pages total.*

Soltesz, S., et al., Container-based operating system virtualization: a scalable, high-performance alternative to hypervisors, Proceedings of the 2nd ACM SIGOPS/EuroSys European Conference on Computer Systems, 2007, pp. 275-287, [retrieved on Mar. 2, 2017], Retrieved from the Internet: <URL:http://dl.acm.org/>.*

Hogg, S., Software Containers: Used More Frequently than Most Realize, Network World, May 26, 2014, 5 pages, [retrieved on Mar. 2, 2017], Retrieved from the Internet: <URL:http://www.networkworld.com/article/2226996/cisco-subnet/software-containers-used-more-frequently-than-most-realize.html>.*

Hu, Y., et al., Resource provisioning for cloud computing, Proceedings of the 2009 Conference of the Center for Advanced Studies on Collaborative Research, 2009, pp. 101-111, [retrieved on Mar. 2, 2017], Retrieved from the Internet: <URL:http://dl.acm.org/>.*

Zhang, Z., et al., Lynn: A Multi-dimensional Dynamic Resource Management System for Distributed Applications in Clouds, 2013 International Conference on Cloud and Service Computing (CSC), 2013, pp. 84-91, [retrieved on Mar. 2, 2017], Retrieved from the Internet: <URL:http://ieeexplore.ieee.org/>.*

* cited by examiner

SOFTWARE CONTAINER RECOMMENDATION SERVICE

RELATED APPLICATIONS

This is a continuation of application of U.S. application Ser. No. 14/309,517, filed Jun. 19, 2014, entitled: Software Container Recommendation Service" which is incorporated by reference in its entirety herein.

BACKGROUND

Generally, applications are developed to be installed on a single computing platform, such as an operating system on a server. The applications may be designed to execute on specific computing architectures where computing resources (e.g., processors and memory) may be shared with other applications installed on a server. As a result, application developers may build and assemble applications in anticipation of deploying the applications across a number of different hardware environments that may include public, private and virtualized servers. Due to the difficulty associated with anticipating interactions with services used by various applications on a server, conflicts may arise within a service that results in poor performance or non-performance of the application.

Software containers may be used to mitigate issues associated with developing and deploying applications across various hardware environments. For example, an application and dependencies utilized by an application may be packed into a software container. The software container may be portable and may enable placement of a software container on servers having different hardware environments. Thus, a software container may be moved from a private server having one computing architecture to a public server having another computing architecture with minimal impact or even no impact on the application.

DETAILED DESCRIPTION

Figure 1:
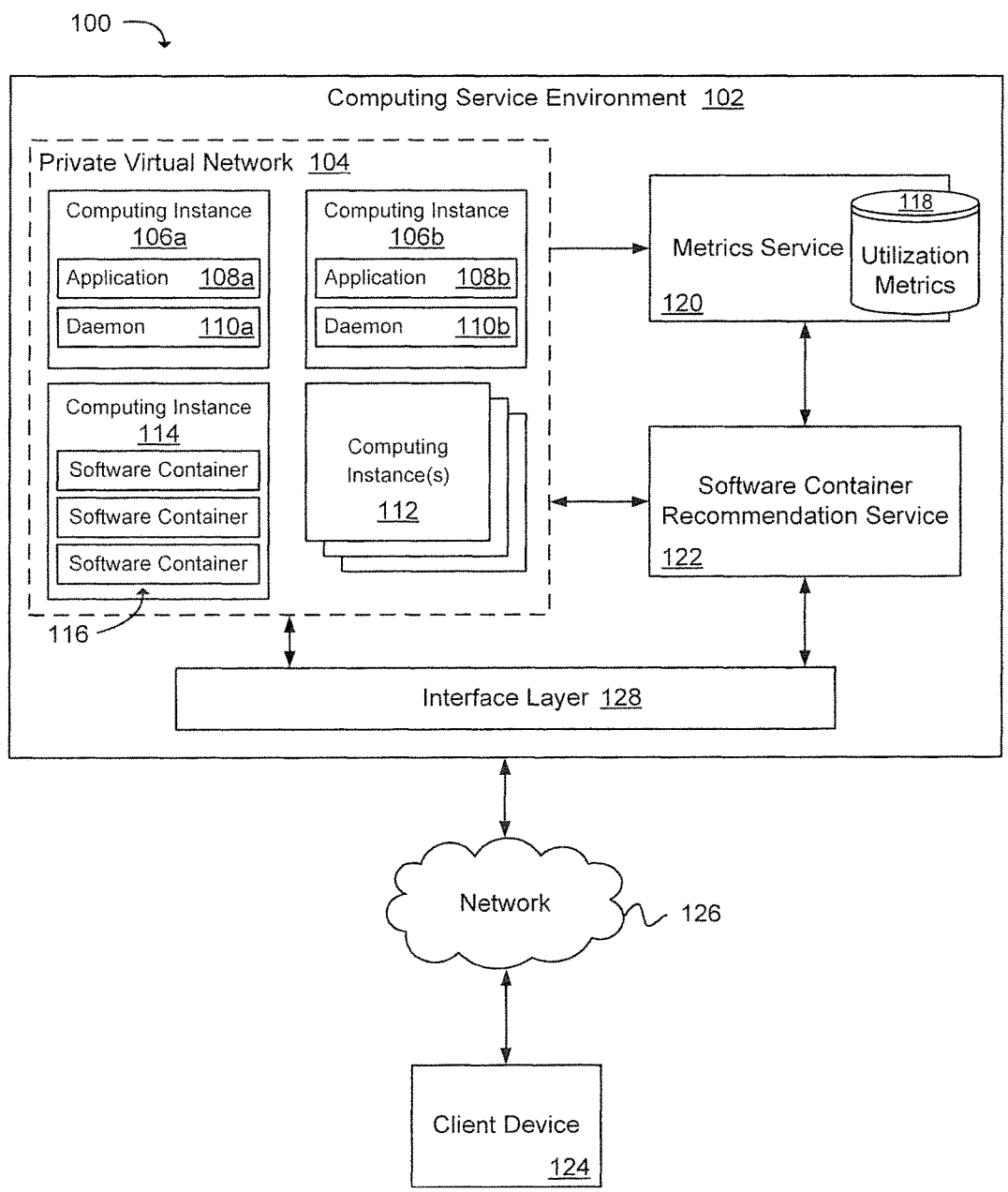
FIG. 1 is a block diagram illustrating a high level example of a system for a software container recommendation service.

A technology is described for a software container recommendation service that may be used to analyze a portion of a computing service environment and recommend a computing service configuration that includes packaging various applications into individual software containers and grouping the software containers on one or more computing instances. In one example configuration, utilization metrics for an application installed on a computing instance may be collected. The utilization metrics may be collected over a predetermined time period (e.g., over a period of days, weeks, months, etc.). The utilization metrics may be a measurement of computing resources (e.g., processing and memory) of a computing instance hosting the application that are used by the application. After collecting the utilization metrics, the utilization metrics may be analyzed to determine a level of capacity utilization by an application hosted on the computing instance (i.e., an amount of computing resources used by an application versus an amount of computing resources available to the application). The level of capacity utilization may then be compared to a defined capacity utilization level (e.g., a total capacity utilization level) to determine whether available computing resources for the host computing instance may be underutilized by the application.

In a case where a determination is made that computing resources for a host computing instance may be underutilized by an application, a software container configuration may be determined for the application. A software container may be a virtual container in which an application and application dependencies may be contained, providing an isolated environment for the execution of the application on a computing instance. A software container configuration may be based in part on utilization metrics collected from the host computing instance. For example, the utilization metrics may provide information about an amount of computing resources used to execute an application packaged into a software container. In addition, a computing instance may be a virtual machine (e.g., an instance of a software implementation of a computer) that executes applications like a physical machine or server.

Specifications of the software container configuration may be provided to a customer (e.g., via a user interface), and upon approval from the customer, a software container script may be generated according to the specifications for the software container configuration. The software container script may then be transferred to a computing instance selected to host the software container, where the software container script may be executed to create the software container. Multiple software containers may be placed on the host computing instance.

In some computing service environments, customers may deploy multiple computing instances for the purpose of hosting applications used within the computing service environment, and each computing instance may host a single application. For example, a computing instance may host a scheduling application that merely instigates computing tasks executed on other computing instances. As a result, a customer may pay for a number of computing instances whose computing resources may be underutilized by the applications hosted on the computing instances. By packaging an application into a software container and consolidating multiple software containers on a single host computing instance, underutilized computing instances may be released back to a computing service provider.

FIG. 1 is a diagram illustrating a high level example of a system 100 in which a software container recommendation service 122 may be implemented. The system 100 may include a computing system environment 102 having a number of private virtual networks 104 that may be accessed using a client device 124 via a network 126. A private virtual network 104 may contain a distributed system that comprises a plurality of computing instances 106a-b, 114 and 112, where a computing instance may be, for example, a virtual machine (e.g., an instance of a software implementation of a computer that executes applications like a physical machine). Also included in the system 100 may be a metrics service 120 and a software container recommendation service 122 that can be used to monitor a private virtual network 104 and provide recommendations to improve computing resource utilization. In one example configuration, the metrics service 120 may be included in the software container recommendation service 122.

As illustrated, a private virtual network 104 may include a number of computing instances 106a-b hosting applications 108a-b that provide network infrastructure support services or other application services. For example, the computing instances 106a-b may host a scheduler service that instigates services, processes, programs or the like located on various other computing instances 112 or may host support services like a Domain Name Server (DNS), a Virtual Private Network (VPN) or Network Address Translation (NAT) service. Some applications 108a-b executing support services on a host computing instance 106a-b may consume less compute and memory resources than what is available on the computing instance 106a-b. Thus, a portion of compute and memory resources for a computing instance 106a-b may go unused by an application 108a-b.

As another illustration, a customer may use a computing instance 106a-b to host an application 108a-b that the customer may wish to isolate from other applications, services, processes and the like on a computing instance 106a-b. For example, a customer may wish to isolate an independent software vendor's small business accounting package from other applications and the customer may provide such isolation by placing the accounting package on a computing instance 106a-b reserved for the accounting package. As such, the customer may isolate the accounting package by installing the accounting package on an unoccupied computing instance 106a-b. As a result, the accounting package may occupy a limited portion of the compute and memory resources of the computing instance 106a-b. Many customers may not be aware of an amount of compute and memory resources for a computing instance 106a-b that an application 108a-b occupies.

By way of the software container recommendation service 122, a customer may be provided with information about the utilization of computing resources for a computing instance 106a-b by an application 108a-b. In one example configuration, a daemon 110a-b on a computing instance (e.g., executing within the operating system on the computing instance) may be used to monitor computing resource utilization by an application 108a-b. A daemon 110a-b may be a background process that, for example, monitors compute and memory resource utilization for a computing instance 106a-b by an application 108a-b. The daemon 110a-b may be in communication with a metrics service 120 and may transmit computing resource utilization data to the metrics service 120. In one example, computing resource utilization data may be collected using a daemon 110a-b over a defined time period, such as over a number of days, weeks or months.

The metrics service 120 may store computing resource utilization data received from a daemon 110a-b in a data store. The metrics service 120 may use the computing resource utilization data to calculate utilization metrics 118 for a computing instance 106a-b. For example, based on computing resource utilization data received from a daemon 108a-b, the metrics service 120 may be able to calculate and store utilization metrics 118 in a data store that may be used to determine whether the computing resources of a computing instance 106a-b may be underutilized by an application 108a-b. The utilization metrics 118, in one example, may provide an average or mean percentage of computing resources for a computing instance 106a-b used by an application 108a-b over a period of time. In another example, utilization metrics 118 may provide a maximum percentage of computing resources used by an application 108a-b, as well as a minimum percentage of computing resources used by the application 108a-b over a period of time. Further, utilization metrics 118 may be broken out so as to provide individual metrics for various computing resources, such as processor metrics, memory metrics, throughput metrics and any other metric that may be used to determine utilization of computing resources for a computing instance 106a-b.

The software container recommendation service 122 may retrieve utilization metrics 118 for an application 108a-b and/or a computing instance 106a-b and may make a determination of whether an application 108a-b may be underutilizing the computing instance 106a-b. In a case where a computing instance 106a-b is determined to be underutilized by an application 108a-b, a recommendation may be provided to a customer, via a user interface, to create a software container configuration for the application 108a-b. Further, the recommendation may include specifying a computing instance 114 on which to execute the software container 116. As an illustration, a recommendation may provide utilization metric information for a computing instance 106a-b hosting an application 108a-b. The recommendation may specify that by packaging the application 108a-b into a software container 116 located on a computing instance 114 hosting multiple software containers 116, the computing instance 106a-b currently hosting the application 108a-b may be released back to a computing service provider or the customer for other uses.

A software container may provide an isolated environment for an application 108a-b on a computing instance 114 by creating a virtual container in which the application 108a-b and application dependencies are contained. More specifically, a software container may make use of an operating system's kernel control groups to limit, account for and isolate a computing instance's resource usage (e.g., processors, memory, disk input and output, etc.) associated with an application's process group (i.e., the collection of processes for the application managed by a shell program). As one specific example, a software container may be an extension of a Linux container that includes an API (Application Programming Interface) providing virtualization that runs an application 106a-b in isolation (i.e., resource isolation including processors, memory, block input and output, network, etc.) and provides separate namespaces that isolate the application 106a-b from an operating environment.

Using utilization metrics 118 associated with an application 108a-b, a software container configuration may be determined. The utilization metrics 118 may be used to determine a software container size (e.g., an amount of processor, memory, block input and output, etc. used to execute an application 106a-b). Further, based in part on the software container configuration, a computing instance 114 may be identified to host the software container configuration.

A customer, using a client device 124 may receive recommendations for software container configurations via a user interface. The user interface may be accessed by way of an interface layer 128 included in the computing service environment 102. In one example, a customer may view software container recommendations from the software container recommendation service 122 and select a recommendation to have an application 108a-b packaged into a software container 116 and placed on a recommended computing instance 114. In one example, a customer may modify a software container recommendation. For example, a customer may modify a software container configuration by increasing or decreasing the resource size of the software container configuration, or the customer may select a different computing instance 114 to host a software container 116. Also, in some examples, a computing service provider may implement software container configuration rules that may specify some limitations on how software containers 116 may be configured, as discussed later in relation to FIG. 5.

Upon selection of a software container configuration, or selection and modification of a software configuration by a customer, a software container script may be generated. The software container script may be used to create a software container 116 for an application 108a-b according to specifications for the software container when the software container script is executed on a computing instance 114 selected to host the software container 116, as is discussed in greater detail later.

Figure 2:
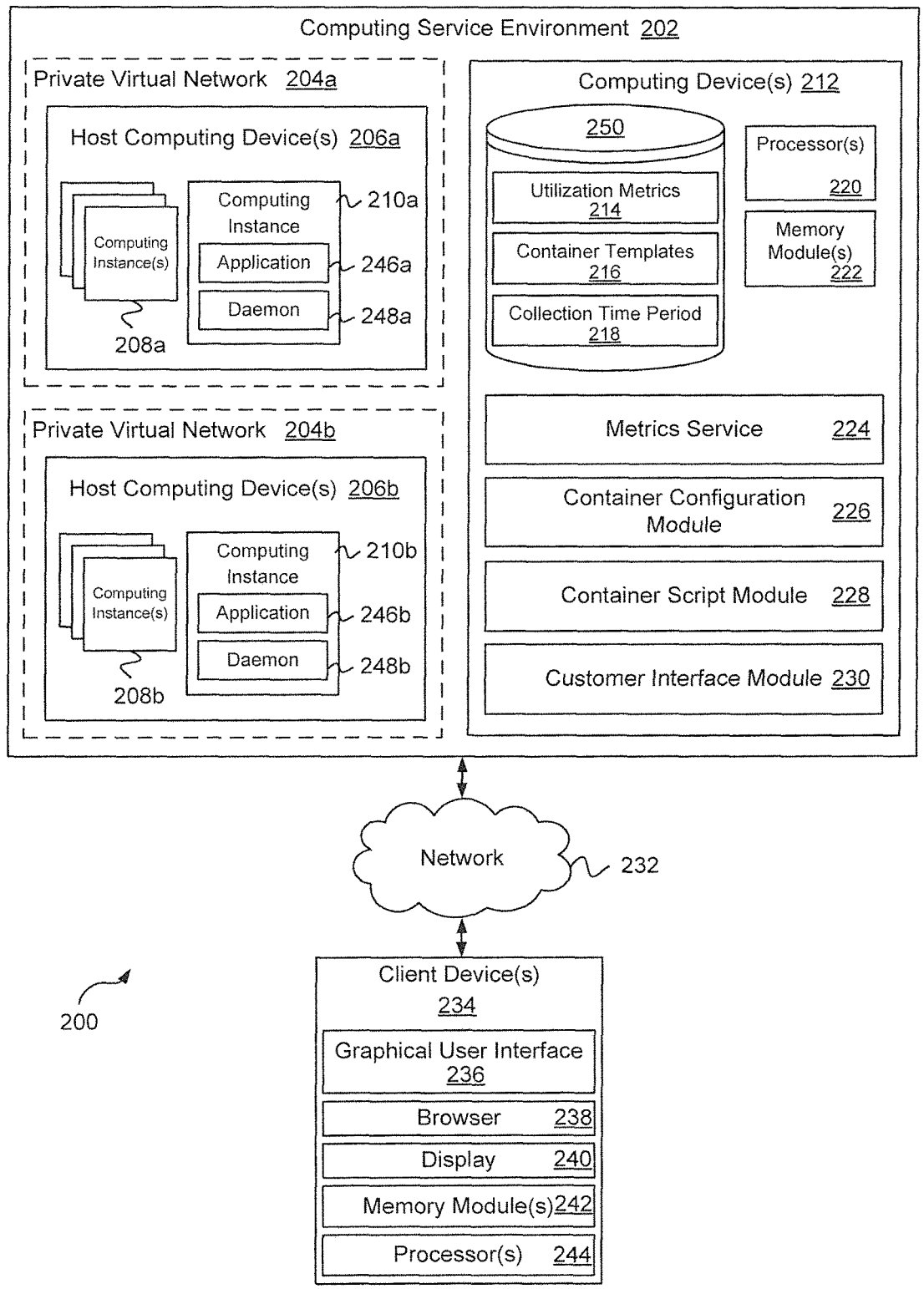
FIG. 2 is a block diagram illustrating an example of various components included in a system for a software container recommendation service.

FIG. 2 illustrates an example of various components of a system 200 on which the present technology may be executed. In one example configuration, the system 200 may include a computing service environment 202 with which a number of client devices 234 may be in communication via a computing network 232. The computing service environment 202 may provide computing services to a number of customers, wherein a customer may implement a private virtual network 204a-b comprising host computing devices 206a-b that host a plurality of computing instances 208a-b and 210a-b. Also included in the computing service environment 202 may be one or more computing devices 212 containing a data store 250, a metrics service 224, a container configuration module 226, a container script module 228, a customer interface module 230, as well as other services, processes, systems, engines, or functionality not discussed in detail herein.

The metrics service 224 may be used to collect computing resource utilization data from daemons 248a-b located on various computing instances 210a-b. In one example, a daemon 248a-b may be installed on a computing instance 206a-b hosting an application 246a-b where the daemon 248a-b may send computing resource utilization data for the computing instance 206a-b to the metrics service 224. The computing resource utilization data may include processor utilization data, memory utilization data, input and output utilization data, as well as utilization data for other computing resources utilized by an application 246a-b. The computing resource utilization data may be transmitted to the metrics service 224 by way of a network connection (e.g., a virtual network). The metrics service 224 may calculate utilization metrics 214 using the computing resource utilization data and store the utilization metrics 214 in a data store 250. The utilization metrics 214 may represent a portion or a percentage of computing resources utilized by an application 246a-b executing on a computing instance 210a-b. In one example, a daemon 248a-b may be instructed to send computing resource utilization data to the metric service 224 for a defined time period. For example, a computing service provider or a customer may specify a collection time period 218 for which to collect computing resource utilization data. The collection time period 218 specified may be for a number of hours, days, weeks or some other amount of time. The collection time period 218 may be stored in a data store 250 and the metrics service 224 may provide instructions to a daemon 246a-b on the collection time period 218, or alternatively, a daemon 246a-b may obtain the collection time period 218 from the data store 250.

Based in part on utilization metrics 214 calculated for a computing instance 210a-b, the metrics service 224, in one example, may determine whether the computing resources of a computing instance 210a-b are being underutilized by an application 246a-b. Illustratively, a utilization threshold value may be used as a measurement of minimum computing instance 210a-b utilization, and may be compared to utilization metrics 214 for a computing instance 210a-b. As one example, an overall utilization threshold value may be compared to a composite score of utilization metrics for processor utilization, memory utilization, etc. In a case where the composite score of utilization metrics may be below the overall utilization threshold value, an associated computing instance 210a-b may be considered as underutilized by an application 246a-b. As such, a recommendation may be made to package the application 246a-b into a software container.

As another example, utilization threshold values for individual computing resources (e.g., a processing utilization threshold value, a memory utilization threshold value, etc.) may be compared to individual utilization metrics associated with a computing instance's individual computing resources (e.g., processing utilization metrics, memory utilization metrics, etc.). In a case where one or more utilization threshold values for individual computing resources exceed a respective individual utilization metric, a determination may be made whether a recommendation is made to package the application 246a-b into a software container.

The container configuration module 226 may be used to calculate a software container configuration for an application 246a-b. A software container configuration may comprise a size of a software container, an application 246a-b that is to be packaged into the software container and any application dependencies that are to be packed into the software container. The size of a software container may refer to sizing specifications indicating an amount on computing resources dedicated to executing the software container. In other words, the size of a software container may specify an amount of processing, memory and other computing resources that may be used to execute an application 246a-b contained in the software container.

In one example, a software container configuration may be calculated based in part on utilization metrics 214 associated with an application 246a-b. The utilization metrics 214 may provide information about computing resources that may be needed to execute the application 246a-b. For example, utilization metrics 214 may show generally an amount of memory that an application 246a-b occupies, an amount of processing used to execute the application 246a-b, a number of input and output operations that are performed by the application 246*a-b*, as well as other computing resources related to utilization metrics 214. Based in part on the utilization metrics 214 associated with an application 246*a-b*, a software container size may be determined. Having determined a software container size, a computing instance 208*a-b* may be selected to host the software container. Selection of a computing instance 208*a-b* may be based in part on the software container size.

Sizing specifications for a computing instance 208*a-b* to host a software container may be determined using the container configuration module 226, where the sizing specifications may indicate a size of a computing instance 208*a-b* that may be used to execute a number of software containers. In some examples, a computing service provider may make various sizes and types of computing instances 208*a-b* available to customers. Illustratively, computing instances 208*a-b* may be offered in sizes ranging from small, medium, large to extra-large, where size indicators may refer to an amount of computing resources (e.g., processing, memory, input/output) that are included in a respective computing instance 208*a-b*. Sizing specifications for a computing instance 208*a-b* may be based on factors that may include a number of software containers that will be placed on a computing instance 208*a-b*, an amount of computing resources used by a software container, the application type included in a software container (e.g., memory intensive application, network intensive application, an input/output intensive application, etc.). Based in part on the factors, a computing instance size may be selected to host one or more software containers.

A customer interface 230 may be a user interface used to provide a customer with recommendations to improve computing resource utilization. Using a client device 234, a customer may access the customer interface 230 to view recommendations, select recommendations for approval or modify specifications of recommendations. The customer interface 230 may be, for example, a graphical user interface, a command line interface, a touchscreen interface or the like. In one example, API calls may be utilized to obtain software container recommendations. For example, an API call for at least one software container configuration may be made to the container configuration module 226. Upon the selection of a software container configuration by a customer, an API call may be made to the container script module 228 requesting that a software container script be created according to a software container configuration and that the software container script be transmitted to a computing instance 208*a-b* selected to host an associated software container.

API calls, procedure calls or other network commands that may be made in relation to the modules and services included in the computing device 212 may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

The container script module 228 may be used to generate a software container script upon approval from the customer. A software container script may be used to create a software container for an application 246*a-b* according to software container specifications when executed on a computing instance 208*a-b* selected to host one or more software containers. As one example, generating a software container script may include creating an application image (e.g., an image of the structure of an application 246*a-b*, application dependencies and stored data associated with the application 246*a-b*) and generating instructions that reference the application image. The instructions, when executed on a host computing instance, create a software container and transfer the application image from a temporary location to the host computing instance where the application image is executed within the software container. In one example, a software container script and/or an application image may be transmitted to a host computing instance 208*a-b* using a cryptographic network protocol, such as SSH (Secure Shell) and SCP (Secure Copy).

In one example configuration, a software container configuration may be shared with other customers via a container template 216 that the customers may obtain and use to create a software container according to the container template 216. For example, a customer may configure a software container for an application, and then create a container template 216 based on the software container configuration. The container template 216 may then be made available to other customers, for example, by way of a container template marketplace or electronic download forum.

A client device 234 may include any device that may be capable of sending and receiving data over a network 232. A client device 234 may comprise, for example a processor-based system such as a computing device. Such a computing device may contain one or more processors 244, one or more memory modules 242 and a graphical user interface 236. A client device 234 may be a device such as, but not limited to, a desktop computer, workstation, network computer, laptop or notebook computer, tablet computer, handheld computer or other devices with like capability. A client device 234 may include a browser 238 that may enable the client device 234 to communicate with the customer interface 230. The client device 234 may include a display 240, such as a liquid crystal display (LCD) screen, gas plasma-based flat panel display, LCD projector, cathode ray tube (CRT), or other types of display devices, etc.

The various processes and/or other functionality contained on the computing device 212 may be executed on one or more processors 220 that are in communication with one or more memory modules 222 according to various examples. The computing device 212 may comprise, for example, of a server or any other system providing computing capability. Alternatively, a number of computing devices 212 may be employed that are arranged, for example, in one or more server banks or computer banks or other arrangements. For purposes of convenience, the computing device 212 is referred to in the singular. However, it is understood that a plurality of computing devices 212 may be employed in the various arrangements as described above.

Various data may be stored in a data store 250 that is accessible to the modules and services contained on the computing device 212. The term "data store" may refer to any device or combination of devices capable of storing, accessing, organizing and/or retrieving data, which may include any combination and number of data servers, relational databases, object oriented databases, cloud storage systems, data storage devices, data warehouses, flat files and data storage configuration in any centralized, distributed, or clustered environment. The storage system components of the data store 250 may include storage systems such as a SAN (Storage Area Network), cloud storage network, volatile or non-volatile RAM, optical media, or hard-drive type media. The data store 250 may be representative of a plurality of data stores 250 as can be appreciated.

The computing network 232 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, cloud, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
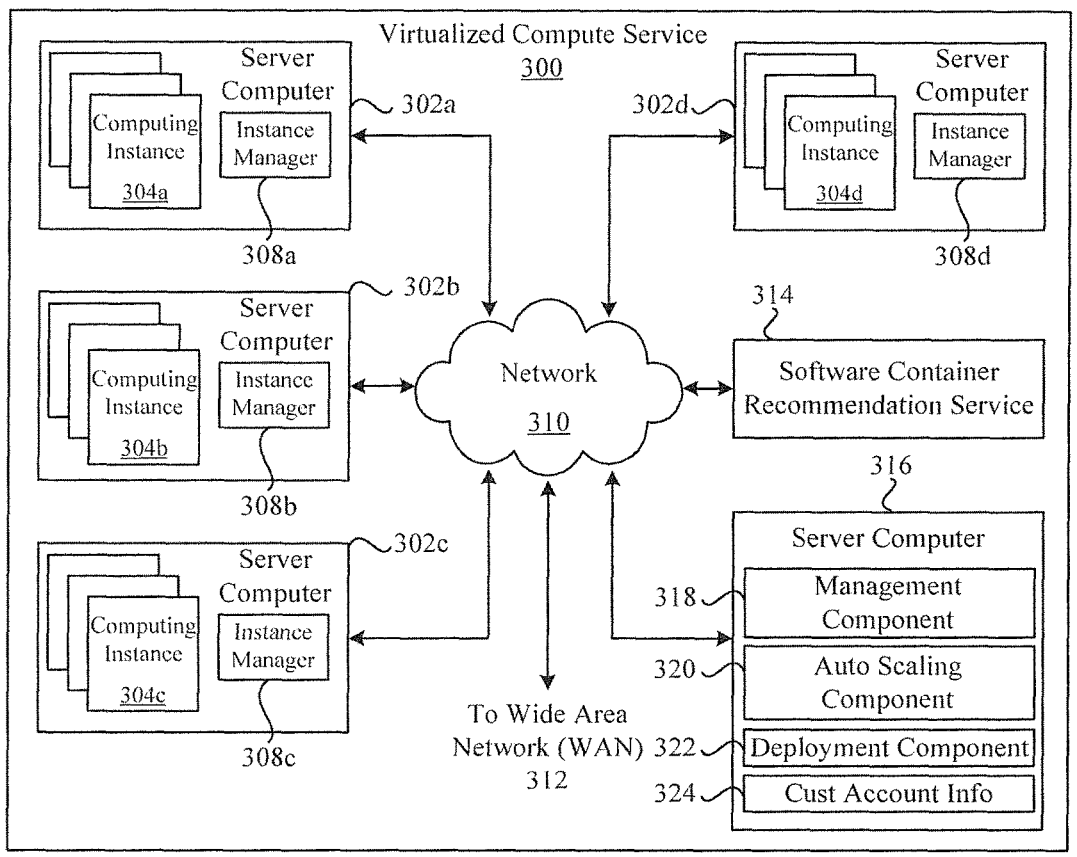
FIG. 3 is a block diagram that illustrates an example of a distributed computing service environment that includes a software container recommendation service.

FIG. 3 is a block diagram illustrating an example virtualized compute service 300 that may include computing instances 304a-d that can be used to host software containers. In particular, the virtualized compute service 300 depicted illustrates one environment in which the technology described herein may be used. The virtualized compute service 300 is one type of environment that includes various virtualized service resources that may be used, for instance, to host a computer cluster or virtualized computing instances. For example, the virtualized compute service 300 may implement nodes of a computer cluster using the computing instances 304a-d.

The virtualized compute service 300 may be capable of delivery of computing and storage capacity as a software service to a community of end recipients. In one example, the virtualized compute service 300 may be established for an organization by or on behalf of the organization. That is, the virtualized compute service 300 may offer a "private cloud environment." In another example, the virtualized compute service 300 may support a multi-tenant environment, wherein a plurality of customers may operate independently (i.e., a public cloud environment). Generally speaking, the virtualized compute service 300 may provide the following models: Infrastructure as a Service ("IaaS"), Platform as a Service ("PaaS"), and/or Software as a Service ("SaaS"). Other models may be provided. For the IaaS model, the virtualized compute service 300 may offer computers as physical or virtual machines and other resources. The virtual machines may be run as guests by a hypervisor, as described further below. The PaaS model delivers a computing platform that may include an operating system, programming language execution environment, database, and web server. Application developers may develop and run their software solutions on the virtualized compute service platform without incurring the cost of buying and managing the underlying hardware and software. The SaaS model allows installation and operation of application software in the virtualized compute service 300. End users may access the virtualized compute service 300 using networked client devices, such as desktop computers, laptops, tablets, smartphones, etc running web browsers or other lightweight client applications, for example. Those familiar with the art will recognize that the virtualized compute service 300 may be described as a "cloud" environment.

The particularly illustrated virtualized compute service 300 may include a plurality of server computers 302a-d. While four server computers are shown, any number may be used, and large centers may include thousands of server computers. The virtualized compute service 300 may provide computing resources for executing computing instances 304a-d. Computing instances 304a-d may, for example, be virtual machines. A virtual machine may be an instance of a software implementation of a machine (i.e. a computer) that executes applications like a physical machine. In the example of a virtual machine, each of the server computers 302a-d may be configured to execute an instance manager 308a-d capable of executing the instances. The instance manager 308a-d may be a hypervisor, virtual machine monitor (VMM), or another type of program configured to enable the execution of multiple computing instances 304a-d on a single server. Additionally, each of the computing instances 304a-d may be configured to execute one or more applications.

One or more server computers 316 may be reserved to execute software components for managing the operation of the virtualized compute service 300 and the computing instances 304a-d. For example, a server computer 316 may execute a management component 318. A customer may access the management component 318 to configure various aspects of the operation of the computing instances 304a-d purchased by the customer. For example, the customer may setup computing instances 304a-d and make changes to the configuration of the computing instances 304a-d. The customer may also specify settings regarding how the computing instances 304a-d are to be scaled in response to demand. An auto scaling component 320 may scale the computing instances 304a-d based upon rules defined by the customer. The auto scaling component 320 may allow a customer to specify scale-up rules for use in determining when instances should be instantiated and scale-down rules for use in determining when existing instances should be terminated, for example. The auto scaling component 320 may consist of a number of subcomponents executing on different server computers 316 or other computing devices. The auto scaling component 320 may monitor available computing resources over an internal management network and modify resources available based on need.

A deployment component 322 may be used to assist customers in the deployment of computing instances 304a-d. The deployment component 322 may have access to account information associated with the computing instances 304a-d, such as the name of owner of the account, credit card information, country of the owner, etc. The deployment component 322 may receive a configuration from a customer that includes data describing how computing instances 304a-d may be configured. For example, the configuration may specify an operating system, provide one or more applications to be installed in computing instances 304a-d, provide scripts and/or other types of code to be executed for configuring computing instances 304a-d, provide cache logic specifying how an application cache should be prepared, and other types of information. The deployment component 322 may utilize the customer-provided configuration and cache logic to configure, prime, and launch computing instances 304a-d. The configuration, cache logic, and other information may be specified by a customer using the management component 318 or by providing this information directly to the deployment component 322.

As explained earlier, computing instances 304a-d used to execute applications (e.g., software components for managing the operation of the virtualized compute service 300) may be released when a software component is underutilizing a host computing instance 304a-d. A software container recommendation service 314 can be used to monitor utilization of computing instances 304a-d and make recommendations for packaging a software component into a software container. The software container may then be placed on a computing instance 304a-d executing other software containers.

Customer account information 324 may include any desired information associated with a customer of the multi-tenant environment. For example, the customer account information may include a unique identifier for a customer, a customer address, billing information, licensing information, customization parameters for launching instances, scheduling information, auto-scaling parameters, etc. As described above, the customer account information 324 may also include security information used in encryption of asynchronous responses to API requests. By "asynchronous" it is meant that the API response may be made at any time after the initial request and with a different network connection.

A network 310 may be utilized to interconnect the virtualized compute service 300 and the server computers 302a-d, 316. The network 310 may be a local area network (LAN) and may be connected to a Wide Area Network (WAN) 312 or the internet, so that end users may access the virtualized compute service 300. It should be appreciated that the network topology illustrated in FIG. 3 has been simplified and that many more networks and networking devices may be utilized to interconnect the various computing systems disclosed herein.

Figure 4A:
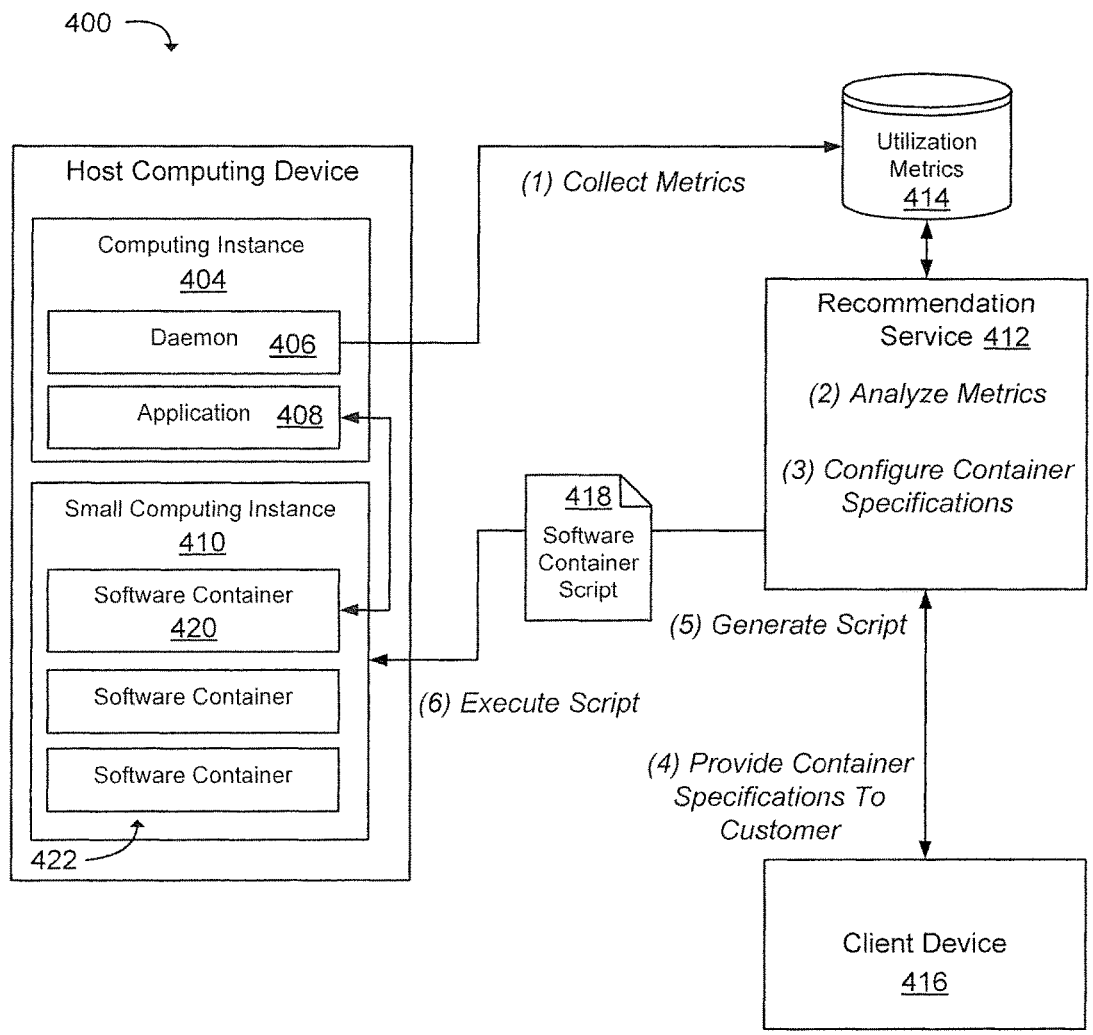
FIG. 4a is a diagram illustrating an example system and method for a software container recommendation service that transmits a software container script to a host.

Moving now to FIG. 4a, a diagram illustrates an example method 400 for recommending software container configurations to a customer. The method may include collecting utilization metrics 414 for an application 408 executing on a computing instance 404. The utilization metrics 414 may be collected over a predetermined time period (e.g., over a period of days, weeks, months, etc.). The utilization metrics 414 may be a measurement of computing resources used by the application 408 when executing on the computing instance 404. For example, utilization metrics 414 may be a measurement of processor utilization, memory utilization, input and output utilization, etc.

In one example, a background service (e.g., a daemon 406) that interfaces with a metric collection service (not shown) may be used to collect utilization metrics 414. A metric collection service may receive capacity utilization metrics 414 from a daemon 406 and store the utilization metrics 414 in a data store. In one example, a recommendation service 412 may perform the function of a metric collection service. In another example, a metric collection service may be a separate service. Alternatively, a hypervisor used to manage computing instances within a computing service environment may provide capacity utilization metrics 414 for a computing instance 404 hosting a single application 408. For example, the hypervisor could provide operating system utilization information for an application 408.

After collecting utilization metrics 414 over a defined time period, the utilization metrics 414 may be analyzed to determine a level of capacity utilization for the computing instance 404 hosting the application 408. Capacity may refer to a computing instance's capacity to execute software installed on the computing instance 404. A level of capacity utilization may refer to an amount of computing resources (e.g., processing, memory, network throughput, etc.) utilized by an application 408 executing on a host computing instance 404. A defined capacity utilization level may be used to determine whether available computing resources may be underutilized in executing the application 408. For example, a percentage (e.g., 35%, 50%, etc.) of computing resources utilized by an application 408 may be defined such that capacity utilization of the computing instance 404 by an application 408 under the percentage indicates underutilization of the computing instance 404. As a specific example, a computing service provider may define a capacity utilization level as a composite score of 55% utilization of processing, memory, network throughput and I/O (Input and output). A computing instance 404 having a composite capacity utilization level below 55% may be considered underutilized.

In a case where a determination has been made that a host computing instance 404 may be underutilized by an application 408, a software container configuration for the application 408 may be determined. A software container may provide an isolated environment for the application 408 on a computing instance 410 by creating a virtual container in which the application 408 and application dependencies are contained, as described earlier.

A software container configuration may include sizing specifications for a software container and sizing specifications for a computing instance to host the software container, as well as other specifications. A software container configuration may be determined based in part on the utilization metrics 414 associated with the application 408. For example, utilization metrics 414 may provide information about an amount of computing resources that may be needed to execute the application 408 packaged into a software container. Specifically, the utilization metrics 414 provide information about the amount of computing resources that the application 408 occupied while executing on the computing instance 404. Therefore, based on the amount of computing resources occupied by the application 408 on the computing instance 404, an inference may be made that a software container may occupy approximately the same amount of computing resources on a host computing instance 410 as was occupied by the application 408 on the computing instance 404.

The sizing specifications for the software container may include specifications for computing resources used to execute the application 408 contained in the software container. For instance, a sizing specification for a software container may include specifications for an amount of processing, memory, network throughput, I/O, etc. used to execute an application 408. As a specific example, sizing specifications for a software container may specify that an associated application 408 may use 15% of processor cycles, 25,500 K of memory and 12% of network throughput.

The sizing specifications for the host computing instance 410 may include specifications for a size of a computing instance. For example, a computing service provider may offer a number of computing instance types and sizes. As a specific example, a computing service provider may offer a general purpose computing instance in small, medium, large and extra-large sizes. Likewise, compute optimized computing instances, memory optimized computing instance, GPU (Graphical Processing Unit) optimized computing instance and storage optimized computing instance types may be offered in various sizes. The size of a computing instance may refer to a computing resource capacity of a computing instance. As a specific example, a small computing instance may include one virtual processor, 4 GBs of memory and 300 GBs of storage, whereas a large computing instance may include 4 virtual processors, 8 GBs of memory and 2 TBs of storage. As such, sizing specification for the host computing instance 410 may specify a size of a computing instance 410 used to host a number of software containers 422.

Sizing specifications for the host computing instance 410 may further consider the number of software containers 422 that are to be placed on an individual host computing instance 410. A determination may be made whether an individual host computing instance 410 can accommodate the software containers, or can accommodate an additional software container 420. Further, a determination may be made whether to select a larger computing instance that can be used to host the software container 420 and software containers 422 hosted on a computing instance that may be fully utilized.

Having determined a software container configuration for an application 408, specifications of the software container configuration may be provided to a client device 416 with a recommendation for implementing the software container configuration. In one example, a recommendation for a software container configuration that includes a recommendation for a host computing instance 410 may be provided to a customer via a graphical user interface that allows the customer to select the recommendation for implementation. A customer may be provided with the ability to modify various aspects of a recommended software container configuration. Illustratively, a customer may modify sizing specifications for a software container, such as increasing or decreasing processing specifications, memory specifications or other computing resource specifications. Also, a customer may modify a sizing specification for a host computing instance 410 by selecting a different computing instance configuration.

Modification of a recommended software container configuration by a customer may be subject to a computing service provider's network security rules. For example, when selecting a computing instance 410 to host a number of software containers 422, an evaluation of applications contained in the software containers 422 may be performed to determine whether including two or more applications on an individual computing instance 410 may result in a security risk. In a case where placing two or more software containers on a computing instance 410 may violate a security rule, a customer's modification may be prevented and the customer may be advised of the security issue.

In one example, upon customer approval to implement a recommended software container configuration or to implement a customer specified software container configuration, a software container script 418 may be generated and the software container script 418 may be transmitted via a network to a computing instance 410 selected to host the software container 420. In one example, a cryptographic network protocol may be used to transmit the software container script 418 to a host computing instance 410.

The software container script 418 may create a software container 420 when executed on a host computing instance 410. In one example, executing a software container script 418 may create a software container by establishing an operating system-level virtualization by way of a virtual environment that includes individual process and network space, thereby isolating an application within the virtual environment. In addition, executing the software container script 418 may create an image of the application 408. Creating an application image may include replicating a structure of an application, application dependencies and stored data associated with the application, as constituted on a computing instance 404. Accordingly, the application image provides a copy of the application 408 that includes the application's data and dependencies that allow for moving the application 408 to a different computing instance without having to reinstall the application 408.

Having created the software container 420 and the application image, the application contained in the software container 420 may then be made available to the customer. Over time, the customer may evaluate sizing specifications for the software container 420 and modify the sizing specifications according to the customer's preference. Also, a customer may evaluate a sizing specification for a computing instance 410 hosting a number of software containers 420 and 422 in order to determine whether a different computing instance (e.g., a smaller or larger computing instance) may better accommodate the software containers 420 and 422.

Figure 4B:
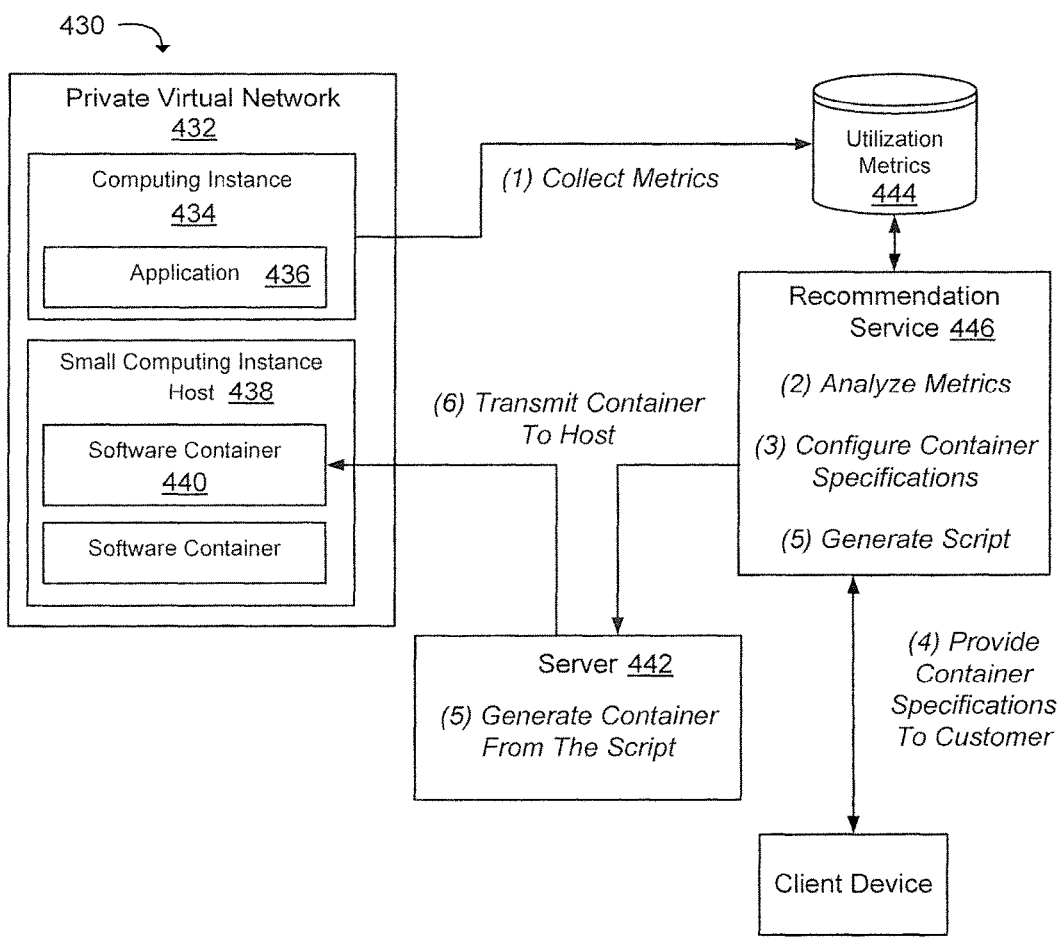
FIG. 4b is a diagram illustrating an example system and method for a software container recommendation service that transmits a software container to a host.

FIG. 4b is a diagram that illustrates another example method 430 for recommending software container configurations to a customer. The method may include using a recommendation service 446 to collect and analyze utilization metrics 444 for an application 436 that executes on a host computing instance 434 to determine a level of capacity utilization for the host computing instance 434. In a case where a determination is made that a host computing instance 434 may be underutilized by an application 436, a software container configuration for the application 436 may be determined as described earlier.

Upon customer approval to implement a recommended software container configuration or to implement a customer modified software container configuration, a software container script may be generated and transmitted via a network to a server 442 located outside of a customer's private virtual network 432. The software container script may be executed on the server 442, thereby creating a software container 440 for the application 436. The software container 440 may then be transmitted to a computing instance 438 selected to host the software container 440 using a cryptographic network protocol.

In another example method (not illustrated), a computing instance may be launched within a customer's private virtual network for the purpose of hosting a number of software containers. After launching the host computing instance, software container scripts for the software containers may be transmitted to the host computing instance and executed, thereby creating the software containers on the host computing instance. The host computing instance may then be provided (e.g., registered) to the customer.

Figure 5:
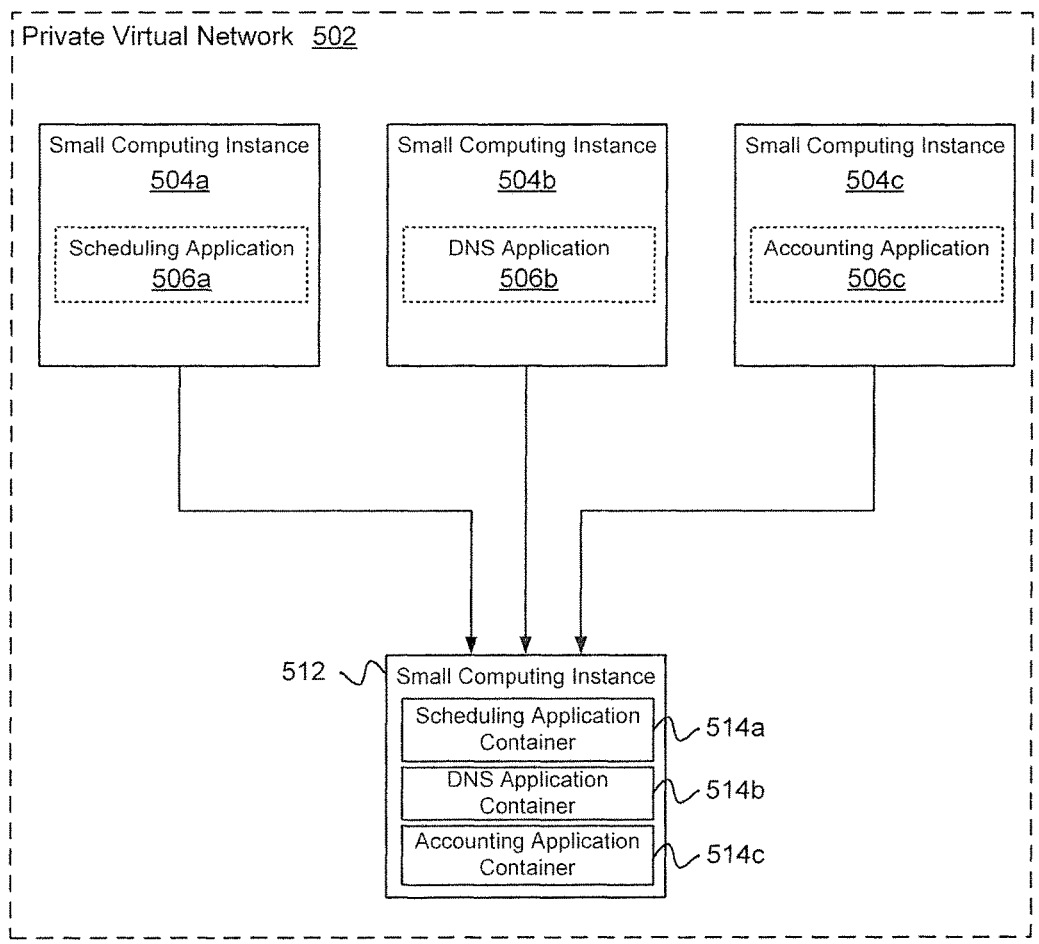
FIG. 5 is a block diagram that illustrates an example method for placing software containers on a computing instance.

FIG. 5 is a diagram illustrating an example of making more efficient use of computing resources by packaging applications 506*a-c* into software containers 514*a-c* that may be located on a single computing instance 512. Illustratively, a computing service model that offers computing instances to customers via a private virtual network 502 or another virtual network may allow a customer to build a distributed system that can be scaled up or down. If a customer wants more compute power or memory, a customer may scale up (i.e., purchase) by adding computing instances to the distributed system. If a customer has excess compute power or memory, the customer can scale down by releasing excess computing instances included in the distributed system back to a computing service provider.

Some example distributed systems may include computing instances 504a-c that host a single application 506a-c that provides supporting infrastructure to the distributed system or other application functions. Namely, an application 506a-c may occupy a single computing instances 504a-c. In some cases, these applications 506a-c may consume less computing resources (e.g., compute and memory) than what may be available on a computing instance 504a-c. In other words, the applications 506a-c may be utilizing a small portion of the available computing resources of a computing instance 504a-c, and as a result, a customer may be paying for computing resources that the customer may not be using.

As an example, a customer may purchase a small computing instance 504a that hosts a scheduling application 506a (e.g., a Cron) that occupies a small fraction of computing resources available on the small computing instance 504a. As another example, a customer may use an application (e.g., a small business accounting application 506c) that the customer wishes to isolate from other applications, and therefore may purchase a small computing instance 504c to host the application. Likewise the isolated application may consume fewer computing resources that what is available on the computing instance 504c.

Customers may be unaware of an amount of computing resources for a computing instance 504a-c used by an application 506a-c. As a result of the present technology, a customer may be advised of computing instance utilization and may be provided with recommendations for software container configurations that may result in consolidating software containers 514a-c onto a computing instance 512. As illustrated, after evaluating a number of computing instance 504a-c for a period of time, a recommendation may be made to package a number of applications 506a-c into separate software containers 514a-c, where the software containers 514a-c may be placed on a single computing instance 512. In one example, sizing specifications of the software containers 514a-c may be used to determine a sizing specification of a computing instance 512 selected to host the software containers 514a-c. For example, based on a sum of sizing specifications for the software containers 514a-c, a computing instance size may be determined (e.g., a small, medium or large computing instance where the size refers to an amount of computing resources available on the computing instance). After placing the software containers 514a-c on a computing instance 512, the computing instances 504a-b that had been hosting the applications 506a-c may be released back to a computing service provider.

Figure 6:
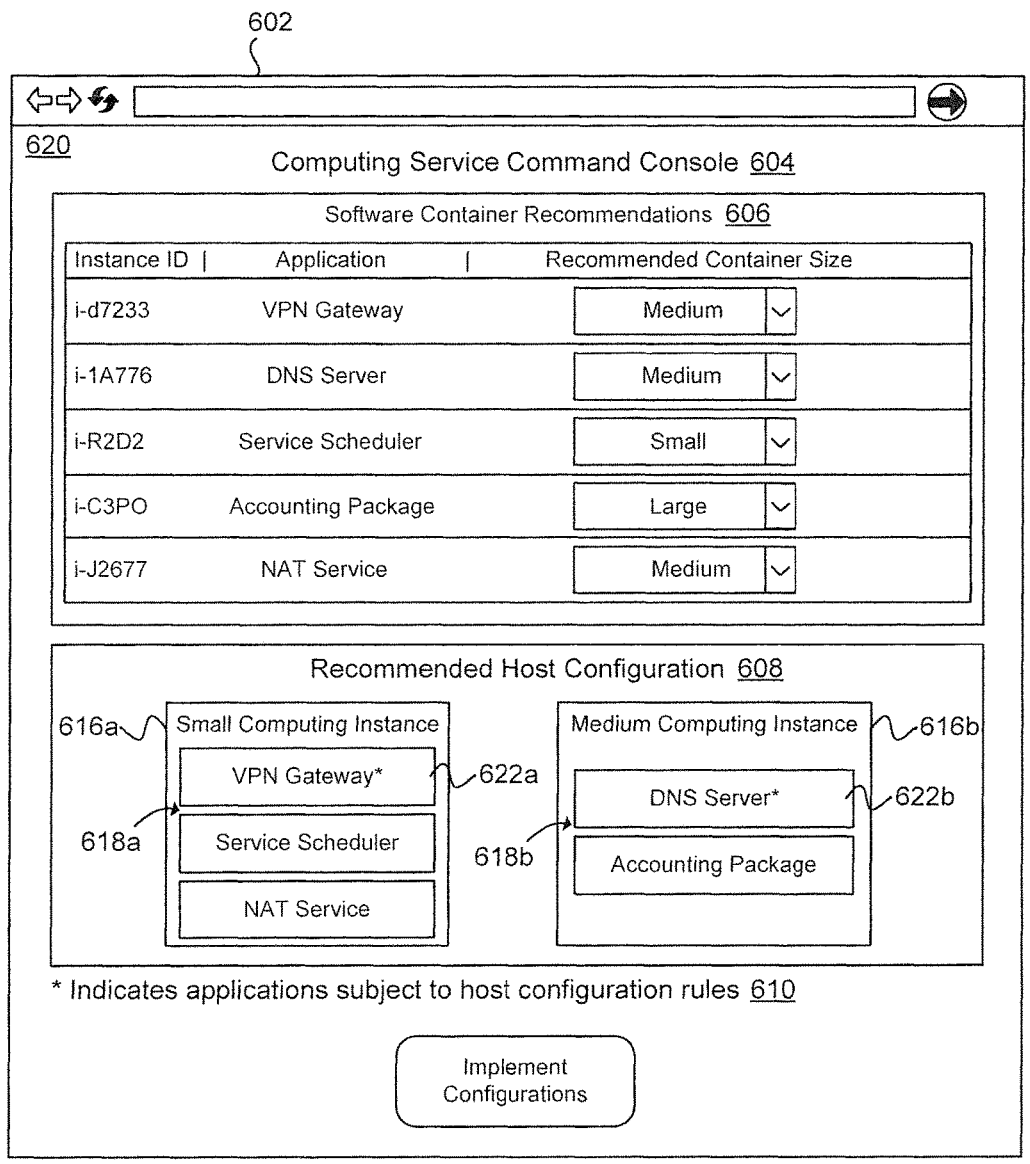
FIG. 6 is a diagram illustrating an example of a graphical user interface for a software container recommendation service.

FIG. 6 is a diagram illustrating an example of a graphical user interface 620 that may allow a customer to view, select or modify a software container configuration. As illustrated, a customer may access the graphical user interface 620 using a browser 602. The graphical user interface 620 may be one aspect of a computing service command console 604 used by a customer to manage the customer's virtual private network environment. Displayed in the graphical user interface 620 may be software container recommendations 606 that identify a computing instance, an application hosted by the computing instance and a size recommendation for a software container for the application. In one example, a customer may modify a software container recommendation 606 by selecting another available software container size.

Also displayed in the graphical user interface 620 may be recommended host configurations 608 that recommend a size for a host computing instance 616a-b and a number of software containers 618a-b to be hosted by the computing instance 616a-b. A customer may accept a recommended host configuration 608 or the customer may modify a recommended host configuration 608 (e.g., by using a drag and drop function) by specifying which software containers a computing instance 616a-b will host. In one example, a visual indicator 610 may be used to identify software containers 622a-b that may not be located on the same computing instance 616a-b due to a computing service provider's security policy restrictions. For example, based on security policies, a computing service provider may not allow certain applications to be hosted by a common computing instance using a software container.

Figure 7:
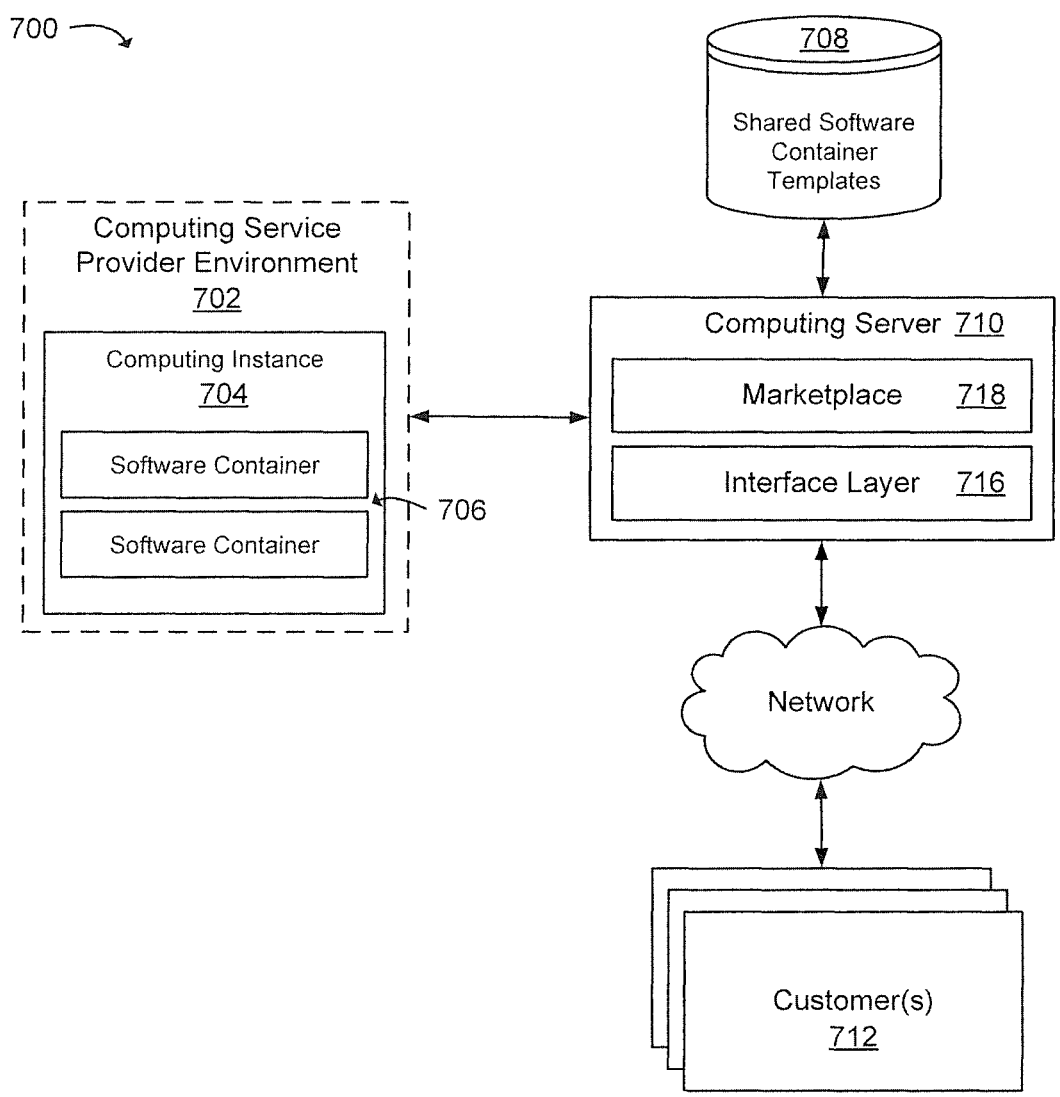
FIG. 7 is a diagram illustrating an example system for making software container templates available to a number of customers.

FIG. 7 is a block diagram illustrating an example system 700 for making software container configurations or software container templates 708 available to a plurality of customers 712. The system 700 may include a data store containing software container templates 708 available to customers 712 via a marketplace 718. For example, using a client device, a customer 712 may access the marketplace 718 by way of an interface layer 716 for a computing server 710. A software container template 708 may be for a software container configuration created by a computing service provider or a customer wishing to make the software container configuration available to other customers 712. In one example, a customer who is making a software container template 708 available to other customers may select customer(s) 712 with whom the software container template 708 is to be shared. In another example, the software container templates 708 may be made available generally to customers 712 of a computing service provider.

In one example configuration, a customer may make a software container template 708 available to customers 712 by including the software container template 708 in a repository accessible to the customers 712. A customer 712 may access a computing server 710 via a client device and view available software container templates 708. The customer 712 may then select a software container template 708 and specify a computing instance 704 included in a computing service provider environment 702 on which to place a software container 706 generated from the software container template 708. After selecting a software container template 708, a software container 706 may be generated (e.g., via a software container script) according to the software container template 708. In one example, a software container script for the software container template 708 may be transmitted to a computing instance 704, whereupon the software container script may be executed to create the software container 706. Transmissions of software container related data between a data store and a computing instance 704 may be performed using a cryptographic network protocol (e.g., SSH and SCP).

Figure 8:
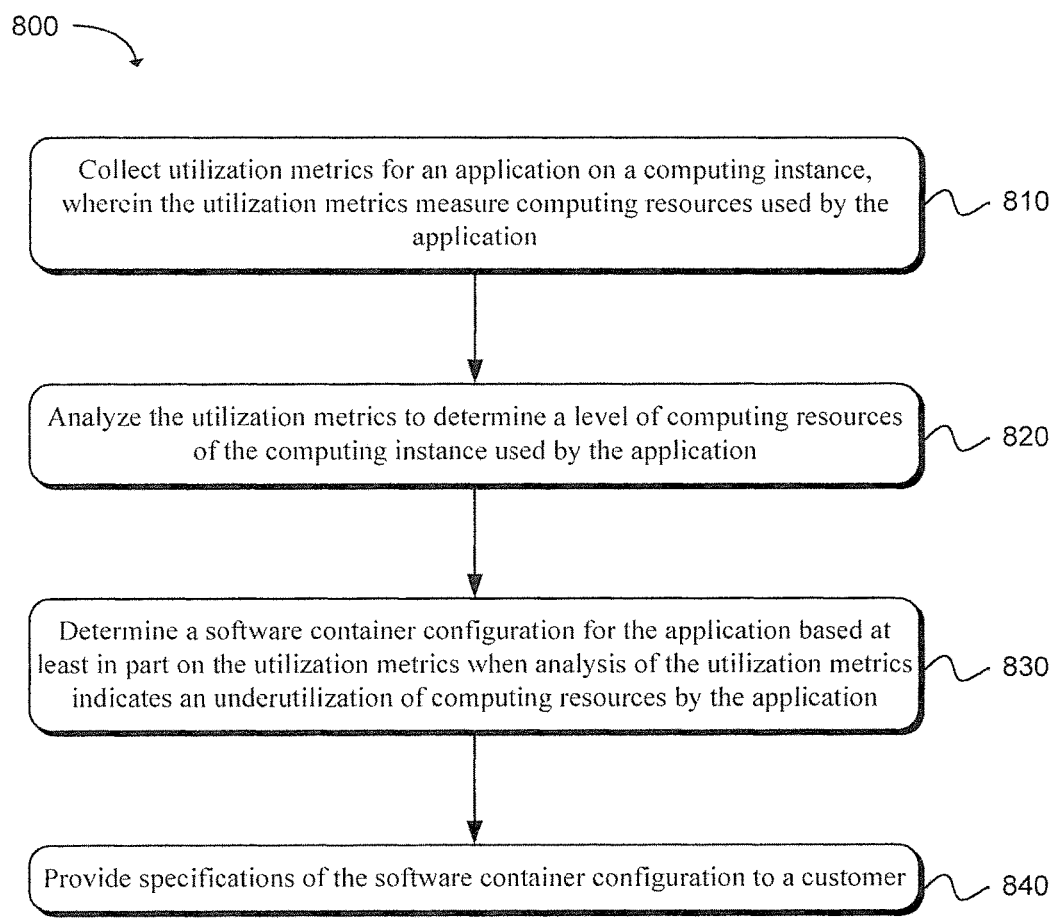
FIG. 8 is a flow diagram illustrating an example method for a software container recommendation service.

FIG. 8 is a flow diagram illustrating an example method 800 for software container configuration recommendations. As in block 810, utilization metrics for an application hosted on a computing instance may be collected, as described earlier. In one example, the computing instance may be a dedicated computing instance hosting a single application. The utilization metrics may measure computing resources for the computing instance used by the application (e.g., processing and memory).

As in block 820, the utilization metrics may be analyzed to determine a level of computing resources of the computing instance used by the application. A capacity utilization level may specify an amount of computing resources occupied by an application. Thus, for example, a capacity utilization level may provide information about computing resources for a computing instance dedicated to hosting a single application that may be unoccupied by the application.

As in block 830, a software container configuration may be determined for the application based at least in part on the utilization metrics when analysis of the utilization metrics indicates an underutilization of computing resources by the application. The software container configuration may include sizing specifications for a software container and sizing specifications for a computing instance hosting multiple software containers. For example, a recommendation may identify or recommend a computing instance that may be used to host multiple software containers. As in block 840, specifications of the software container configuration may then be provided to a customer, who may accept the specifications or modify the specifications according to the customer's wishes. Upon acceptance, a software container may be created for the application on a host computing device according to the specifications.

Figure 9:
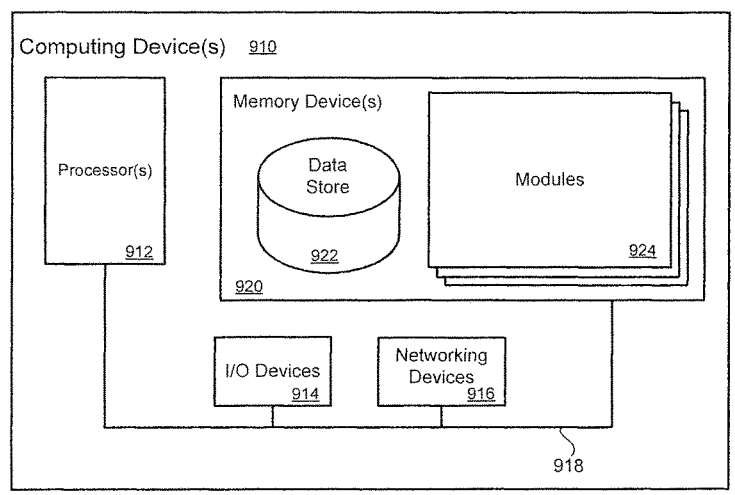
FIG. 9 is block diagram illustrating an example of a computing device that may be used to execute a method for a software container recommendation service.

FIG. 9 illustrates a computing device 910 on which modules of this technology may execute. A computing device 910 is illustrated on which a high level example of the technology may be executed. The computing device 910 may include one or more processors 912 that are in communication with memory devices 920. The computing device 910 may include a local communication interface 918 for the components in the computing device. For example, the local communication interface 918 may be a local data bus and/or any related address or control busses as may be desired.

The memory device 920 may contain modules 924 that are executable by the processor(s) 912 and data for the modules 924. Examples of services and modules located in the memory device 920 may include a metrics service, a container configuration module, a container script module, a customer interface module and other modules. The modules may execute the functions described earlier. A data store 922 may also be located in the memory device 920 for storing data related to the modules and other applications along with an operating system that is executable by the processor(s) 912.

Other applications may also be stored in the memory device 920 and may be executable by the processor(s) 912. Components or modules discussed in this description that may be implemented in the form of software using high programming level languages that are compiled, interpreted or executed using a hybrid of the methods.

The computing device may also have access to I/O (input/output) devices 914 that are usable by the computing devices. Networking devices 916 and similar communication devices may be included in the computing device. The networking devices 916 may be wired or wireless networking devices that connect to the internet, a LAN, WAN, or other computing network.

The components or modules that are shown as being stored in the memory device 920 may be executed by the processor(s) 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory 920 may represent multiple memory units that operate in parallel to the processing circuits. This may provide parallel processing channels for the processes and data in the system. The local interface 918 may be used as a network to facilitate communication between any of the multiple processors and multiple memories. The local interface 918 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory machine readable storage medium having instructions embodied thereon, the instructions when executed by a processor:
   monitor utilization metrics measuring computing resources for a computing device used to execute an application over a predetermined time period;
   analyze the utilization metrics to determine a level of capacity utilization of the computing resources used to execute the application using a defined capacity utilization level to determine whether the computing resources are underutilized in executing the application;
   determine a software container configuration for the application using the utilization metrics as a result of underutilization of the computing resources by the application, the software container providing an isolated environment for the application in a virtual container in which the application and application dependencies are contained; and
   create the software container for the application according to the software container configuration for the application on a host computing device selected to host the software container.

2. A non-transitory machine readable storage medium as in claim 1, further comprising instructions that when executed by the processor determine a minimal amount of computing resources used to execute the software container configuration, based at least in part on the utilization metrics that provide a measure of computing resources used to execute the application.

3. A non-transitory machine readable storage medium as in claim 1, wherein the host computing device selected to host the software container hosts multiple software containers.

4. A computer implemented method, comprising:
   analyzing utilization metrics, using a processor, to determine a level of computing resources used by an application executing on a computing instance;
   determining a software container configuration for the application, using the processor, when analysis of the utilization metrics indicates an underutilization of computing resources by the application based at least in part on the utilization metrics, a software container providing an isolated environment for an application on a computing instance by creating a virtual container in which the application and application dependencies are contained;
   providing specifications of the software container configuration; and
   creating the software container for the application according to the software container configuration for the application on a computing device selected to host the software container.

5. A method as in claim 4, further comprising generating a software container script used to create the software container for the application when executed on the computing device selected to host the software container.

6. A method as in claim 4, further comprising transmitting a software container script to the computing device selected to host the software container, wherein executing the software container script on the computing device creates the software container.

7. A method as in claim 6, further comprising transmitting the software container script to the computing device selected to host the software container using a cryptographic network protocol.

8. A method as in claim 4, further comprising collecting utilization metrics by a daemon on the computing instance executing the application, where the computing instance interfaces with a data collection service to receive utilization metrics and store the utilization metrics in a data store.

9. A method as in claim 8, further comprising collecting utilization metrics using the daemon for a defined period of time.

10. A method as in claim 4, wherein determining the software container configuration further comprises determining a sizing specification for the software container, the sizing specification indicating a constraint on computing resources used to execute an application contained in the software container.

11. A method as in claim 4, further comprising determining sizing specifications for the computing device to host the software container where the sizing specifications indicate an amount of computing resources available on the computing device to execute the software container.

12. A method as in claim 4, further comprising placing a plurality of software containers on the computing device where sizing specifications of the plurality of software containers are used to determine a sizing specification of the computing device.

13. A method as in claim 4, further comprising providing a software container template configured for a first customer to a second customer, wherein the software container template is transmitted to the computing device owned by the second customer.

14. A method as in claim 4, further comprising transmitting the software container generated according to the software container configuration to the computing device using a network protocol.

15. A method as in claim 4, further comprising receiving modifications to the software container configuration submitted by a customer.

16. A method as in claim 4, further comprising receiving a selection of the computing device to host the software container created using the software container configuration.

17. A system comprising:
a processor;
a data store for utilization metrics;
a memory device including instructions that, when executed by the processor, cause the system to:
monitor utilization metrics for a computing device used to execute an application and store the utilization metrics in the data store, wherein the utilization metrics measure computing resources used to execute the application;
analyze the utilization metrics to determine a level of capacity utilization of the computing device used to execute the application;
determine a software container configuration based at least in part on the utilization metrics when analysis of the utilization metrics indicates an underutilization of the computing resources by the application, a software container providing an isolated environment for an application on a computing device by creating a virtual container in which the application and application dependencies are contained; and
create the software container for the application according to the software container configuration for the application on a host computing device selected to host the software container, wherein the host computing device hosts multiple software containers.

18. A system as in claim 17, wherein the memory device includes instructions that, when executed by the processor, causes the system to receive capacity utilization data for the application collected from the computing device executing the application and calculate utilization metrics used to determine specifications of the software container for the application.

19. A system as in claim 17, wherein the memory device includes instructions that, when executed by the processor, causes the system to receive modifications to the software container configuration from a customer.

20. A system as in claim 17, wherein the memory device includes instructions that, when executed by the processor, causes the system to receive a request to create the software container according to the software container configuration and transmit the software container to a specified computing device.

* * * * *